US009009240B2

(12) United States Patent
Milic-Frayling et al.

(10) Patent No.: US 9,009,240 B2
(45) Date of Patent: Apr. 14, 2015

(54) DYNAMIC CONTROL OF AN ELECTRONIC MESSAGE SYSTEM

(75) Inventors: Natasa Milic-Frayling, Cambridge (GB); Gavin Smyth, Huntingdon (GB); Gabriella Kazai, Bishops Stortford (GB); Gerard Oleksik, Stoke-on-Trent (GB); Jamie Costello, St. Albans (GB)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 13/327,240

(22) Filed: Dec. 15, 2011

(65) Prior Publication Data

US 2013/0159426 A1    Jun. 20, 2013

(51) Int. Cl.
*G06F 15/16* (2006.01)
*G06Q 10/10* (2012.01)
*H04L 12/58* (2006.01)

(52) U.S. Cl.
CPC ............... *G06F 15/16* (2013.01); *G06Q 10/10* (2013.01); *H04L 12/58* (2013.01); *H04L 12/588* (2013.01); *H04L 12/5885* (2013.01)

(58) Field of Classification Search
CPC ... G06F 21/41; G06F 17/30265; G06F 15/16; H04L 67/02; H04L 63/10; H04L 63/0861; H04L 12/5835
USPC .................................. 709/206, 224; 370/432
See application file for complete search history.

(56) References Cited

U.S. PATENT DOCUMENTS

| | | | |
|---|---|---|---|
| 7,437,170 B2 * | 10/2008 | Dunn et al. .................... | 455/518 |
| 7,454,778 B2 | 11/2008 | Pearson | |
| 7,483,948 B2 | 1/2009 | Auhagen | |
| 7,529,804 B1 | 5/2009 | Lu | |
| 7,783,711 B2 | 8/2010 | LeVasseur | |
| 8,189,609 B2 * | 5/2012 | Bouthemy et al. ............. | 370/432 |
| 2003/0203734 A1 * | 10/2003 | Igloi et al. ...................... | 455/431 |
| 2005/0274793 A1 * | 12/2005 | Cantini et al. ................. | 235/379 |
| 2007/0239822 A1 * | 10/2007 | Tuttle et al. .................... | 709/203 |
| 2008/0103867 A1 * | 5/2008 | Moore et al. ....................... | 705/9 |
| 2009/0319623 A1 | 12/2009 | Srinivasan | |
| 2010/0062786 A1 * | 3/2010 | Zhang et al. ................ | 455/452.1 |
| 2010/0211644 A1 | 8/2010 | Lavoie | |
| 2011/0047222 A1 | 2/2011 | Farrell | |
| 2011/0231499 A1 * | 9/2011 | Stovicek et al. .............. | 709/206 |
| 2012/0157044 A1 * | 6/2012 | Kim et al. ...................... | 455/410 |
| 2013/0151690 A1 * | 6/2013 | Shah et al. ..................... | 709/224 |

OTHER PUBLICATIONS

Introducing InterScan™ Messaging Security Suite—Published Date: Aug. 1, 2011.

* cited by examiner

*Primary Examiner* — Tesfay Yohannes
(74) *Attorney, Agent, or Firm* — Steve Wight; Judy Yee; Micky Minhas

(57) ABSTRACT

Methods of dynamic control of an electronic message system are described. In an embodiment, a system which is separate from a messaging service within the electronic message system generates an event signal which relates to an event external to the messaging service. The event signal is received by the messaging service and this triggers a dynamic update in one or more electronic messages which are identified based on the event signal received. For example, the dynamic update may result in the message content being displayed in a different manner or the message being delivered or deleted. Examples of external events include a community response to a particular message, based on a subset of information about the message which has been shared, the location of one or more users and a change in membership of a group.

19 Claims, 8 Drawing Sheets

DYNAMIC CONTROL OF AN ELECTRONIC MESSAGE SYSTEM

BACKGROUND

There are now many different email systems in use. Many of these systems allow a user to specify rules about how incoming messages are handled or displayed. For example, emails received from a particular sender may be color-coded or directed to a particular folder. Many email systems also include junk mail filtering mechanisms such that emails received from particular senders do not appear in a user's inbox but are directed to a specific junk email folder on receipt and the messages may be automatically deleted after a defined amount of time.

The embodiments described below are not limited to implementations which solve any or all of the disadvantages of known electronic message systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods of dynamic control of an electronic message system are described. In an embodiment, a system which is separate from a messaging service within the message system generates an event signal which relates to an event external to the messaging service. The event signal is received by the messaging service and this triggers a dynamic update in one or more electronic messages which are identified based on the event signal received. For example, the dynamic update may result in the message content being displayed in a different manner or the message being delivered or deleted. Examples of external events include a community response to a particular message based on a subset of information about the message which has been shared, the location of one or more users and a change in membership of a group.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, existing email systems include mechanisms which evaluate emails on receipt and based on this evaluation change the way in which they are displayed (e.g. by displaying them in a particular color) or move them into a particular folder (e.g. by putting them in a junk email folder). These actions are often based on user-specified rules and although an email may be examined more than once, each email is only evaluated once at any place in the system, e.g. when the email is received by the email system (for junk email filtering) and when it reaches the recipients inbox (for application of any user-specified rules).

Figure 1:
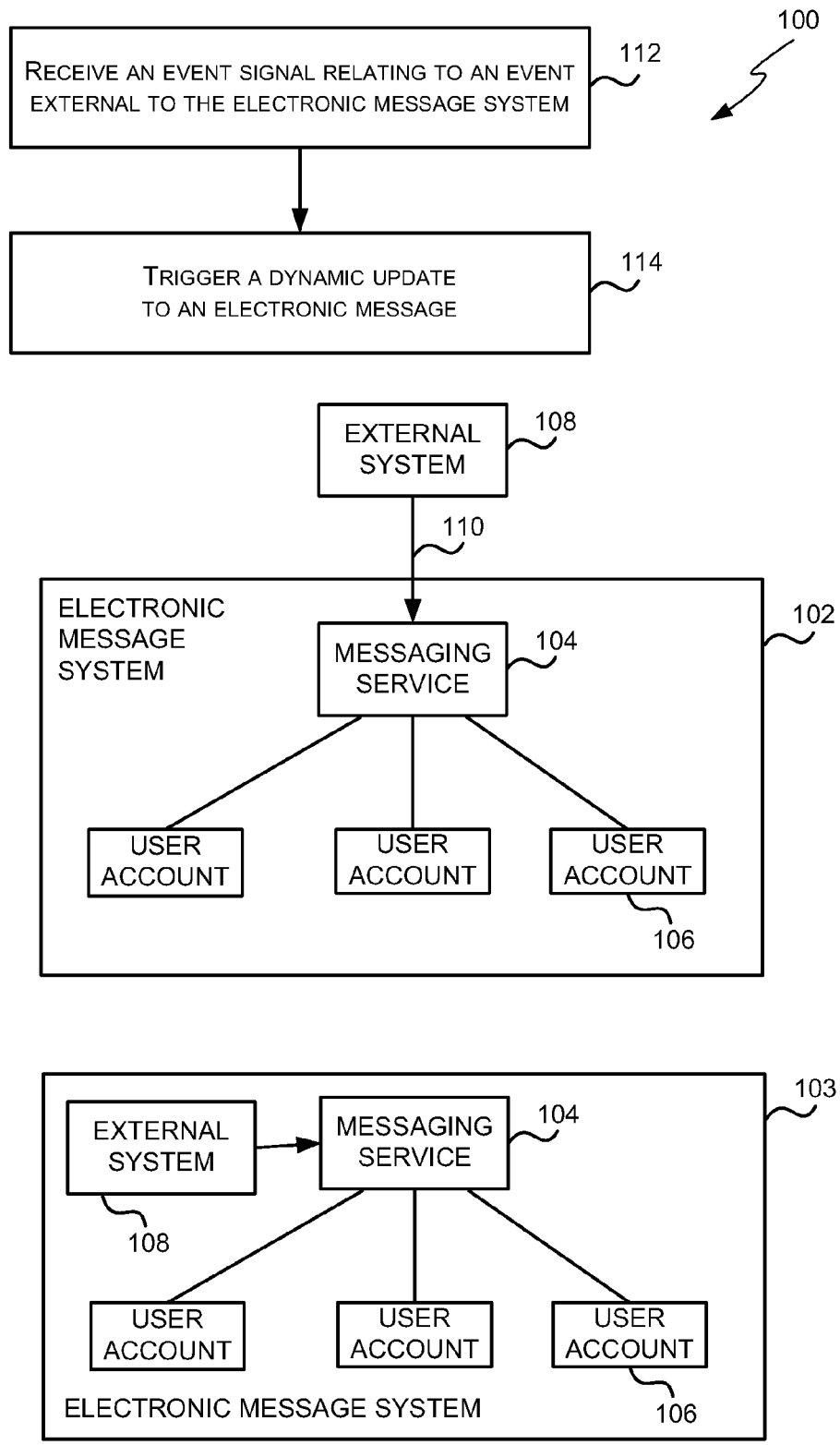
FIG. 1 shows a flow diagram of an example method of controlling an electronic message system and two schematic diagrams of a system in which the method may be implemented.

FIG. 1 shows a flow diagram 100 of an example method of controlling an electronic message system, such as an email system, and two schematic diagrams of a system 102, 103 in which the method may be implemented. As shown in the schematic diagrams, the electronic message system 102, 103 comprises a number of subparts 104-106 which in this example are shown as a messaging service 104 and multiple user accounts 106. The messaging service 104 enables authoring, persistence, and transport of messages among entities such as organizations, individuals, devices, etc, who have user accounts 106, and an example of this service 104 is described in more detail with reference to FIG. 2. The user (or entity) accounts are clearly delineated (e.g. through strong enforcement of the account boundaries by the messaging service) such that they distinguish one user from the other and, therefore, partition the data store and functionality based on the account properties. For example, user account owners (who may also be referred to as user account holders) may keep their data private and inaccessible by other users. Any interaction between entities, i.e., user of the messaging system and the rest of the users or an external environment (such as external system 108) is facilitated by the messaging service 104. The messaging service 104 may provide application programming interfaces (APIs) to facilitate input of external services or entities (e.g. external system 108) that are outside its scope.

The external system 108 comprises any system or service which is not an integral part of the messaging service 104 (i.e. it is outside the scope of the messaging function and message exchange procedure within the system 102, 103). The external system 108 is therefore clearly distinguishable and separate from the messaging service 104. The external system 108 and the messaging service 104 communicate via a programmatic interface (e.g. an API). As shown in the two schematic diagrams in FIG. 1, the external system 108 may be external to the electronic message system 102 or within the electronic message system 103. Where the external system 108 is within the electronic message system 103 but external to the messaging service 104 (i.e. separate from the message exchange process), the external service 108 may use aspects of the messaging service 104 (e.g. user lists within the messaging service 104). For example, if the sender decides to change the color of the font during the authoring process, that is not an external event since it is part of the message authoring and sending. However, if the electronic message system has a mood detector that continuously monitors the sender's mood and based on the mood, interfaces with the message exchange process (i.e. the messaging service 104 or parts of that service) to forward all the user's sent messages to the monitoring physician, or displays the messages that the physician already received at the top of the physician's inbox, the mood detector is an external system within the meaning described herein and the message that interfaces to the messaging service comprises an external event signal.

The electronic message systems 102, 103 shown in FIG. 1 may be based on a client-server architecture, a peer to peer architecture, a hybrid approach or any other architecture.

According to the method, a subpart of the electronic message system 102, 103 (e.g. the messaging service 104 or a user account 106 via the messaging service 104) receives an event signal 110 from the external system 108 (block 112). This event signal 110 relates to an event external to the messaging service 104 (and which may, in some examples, also be external to the electronic message system) and the event may have occurred within the external system 108 or may have occurred externally to the external system 108 but been detected or recorded by the external system 108. In response to receipt of the event signal (in block 112), the electronic message system 102, 103 (e.g. the subpart receiving the event signal or the messaging service 104), identifies one or more electronic messages, based on the event signal received, and then triggers a dynamic update to the identified electronic messages within the system (block 114).

Figure 2:
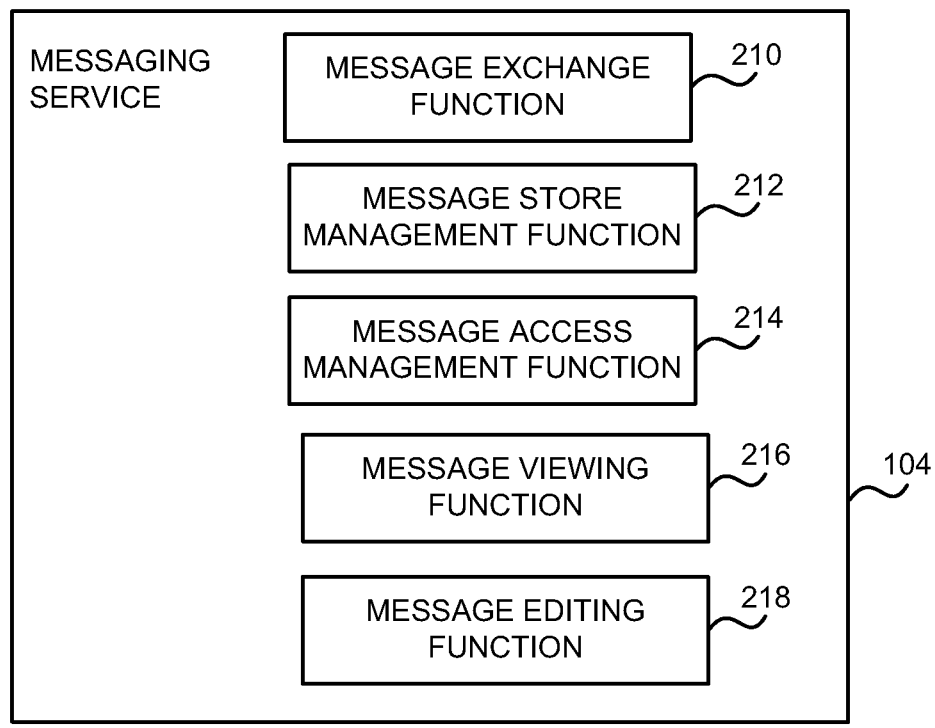
FIG. 2 is a schematic diagram of an example messaging service.

FIG. 2 is a schematic diagram of the messaging service 104 which comprises a number of functions including a message exchange (or routing) function 210 which enables the transfer of messages from one user account to another (whether that user account is within the same system or not). For each message that is authored by a given user account, the message exchange function 210 leverages other messaging service functions (such as one or more of functions 212-218) to store or cache temporary message drafts (e.g. by interaction with the message store management function 212), to monitor and action message commands, such as send, forward and reply, to resolve the email addresses (or aliases) of the receiving entities (e.g. by interaction with the message access management function 214) and to propagate the message to the receiving messaging service.

The message store management function 212 (or message management function) manages the storing of received, sent and drafted messages. The message access management function 214 (or message account management function) maintains a list of user accounts handled by the messaging service 104 (i.e. those accounts within the electronic message system in which the messaging service 104 is located). The message viewing function 216 (or message display function) sends instructions to client applications or whatever application renders the messages on a display in order that the recipient can consume the message. These instructions detail what information to display and how it should be displayed on the screen to the user and in some instances, this viewing function 216 may take into account the properties of the client display. The message editing (or authoring) function 218 enables the sender to create a message.

It will be appreciated that a messaging service 104 need not comprise all the functions shown in FIG. 2 and in some examples, additional functions may be provided. Where messages are not displayed graphically, the message viewer function 216 may be replaced (or supplemented) with an alternative function which provides the message to the viewer in a non-graphical form, e.g. by providing the message in audible format.

The external event signal 110 which is received (in block 112) may connect with a different part of the messaging service 104 depending upon the type of dynamic update which is to be triggered (in block 114). For example, if the messaging system receiving the event signal needs to resend or forward a message, the event signal may connect with the message exchange function 210 within the messaging service 104. In other examples, the event signal may connect with the message viewer function 216, e.g. to change the way that messages are displayed.

The electronic message system 102, 103 may, for example, be an email system (such as Microsoft® Exchange) and the electronic message may be an email message, calendar appointment, meeting request, task notification etc. In other examples, the electronic message system may be a text messaging system (e.g. an SMS or pager system), instant messaging system (e.g. where IM messages are stored) or other system for transmitting electronic messages.

In an example, the external system 108 may be a social networking system/application (e.g. which may be external to or within the electronic message system 102, 103). In other examples, the external system 108 may be another type of networking tool (e.g. business networking tools or other specialist networking tools), a business management system/application (e.g. for tracking human resources information, organization charts etc) or a user location system/application (e.g. which tracks and stores the positions of users, for example, using users' cell phones, where a user gives permission for this data to be collected and used in this way). Further examples include a system or application which monitors and tracks external variables such as weather (e.g. temperature), stock prices, currency exchange rates, etc. As described above, the external system 108 is separate from the messaging service 104 and in particular from the message exchange function 210 within the messaging service 104. In many examples, the external system 108 is not an electronic message system, although in other examples, it may comprise an electronic message system which serves a different population of users (or account holders).

The event signal 110 which is sent by the external system 108 comprises any input to the electronic message system 102, 103 that is not generated through the internal operations of the messaging service 104. In various examples, the event signal 110 may comprise an electronic message (e.g. email, IM message, calendar event, posting, text message, signaling packet, etc) which is triggered by an external event, such as actions within a social networking system, a change in organization structure made within a business management system, an update to a distribution list, an external variable meeting predefined criteria (e.g. a stock price reaching a target value, a temperature exceeding a particular value), a particular user (or group of users) being in a predefined location or a group of users being in the same place (i.e. co-located). In some examples, the event signal electronic message may contain information relating to the external event (e.g. a value of an external variable or data describing the change in organization structure); however in other examples, the event signal may be triggered by an external event but the resulting electronic message sent from the external system 108 to the electronic message system 102, 103 may be generic (i.e. such that it does not contain information relating to the external event).

In some examples, the event signal 110 may relate to a particular electronic message (or messages) within the electronic message system 102, 103 and this message (or messages) to which it relates may be identified in the event signal. In such an example the event signal 110 itself defines which electronic message(s) within the electronic message system 102, 103 is dynamically updated in response to receipt of the event signal 110 (in block 114). In other examples, however, the event signal may not identify a specific electronic message (and in many examples the external system 108 may not be aware of what messages are within the electronic message system 102, 103) and instead the electronic message system 102, 103 (e.g. the messaging service 104) may determine which electronic message(s) within the electronic message system should be dynamically updated (in block 114) as a result of receipt of the event signal (e.g. based on pre-defined propagation triggers).

Where the event signal does identify a specific message (as described above), the electronic messages within the electronic message system 102, 103 may each have a unique identifier (e.g. a message ID) which may be in the form of a number (e.g. a sequential number, a value which is a hash of the message details/contents etc), string, globally unique identifier (GUID), or any other format. Alternatively, the message may be identified based on characteristics of the message where a combination of characteristics is likely to uniquely identify a message (e.g. a combination of any of sender, recipients, title and number of characters in the message, whether a message has an attachment, a message type etc). There may be time-restrictions within the system such that only messages sent within a defined period of time (e.g. the last month) may be able to be dynamically updated using the methods described herein.

In other examples, the event signal may not identify a specific message, but may identify message characteristics such that the signal relates to any message with those characteristics, e.g. all messages sent to a particular combination of recipients (who may be defined in terms of a distribution list) or all messages of a particular type (e.g. email, calendar entry, etc). Again, as described above, there may be time-restrictions associated with this, such that the event signal only relates to messages with particular characteristics which were generated in the preceding 24 hours, week, or other specified time period. The message which is updated in block 114 may, therefore, be identified based on the event signal and in some examples based also on other parameters.

There may be multiple parties (e.g. a sender and one or more recipients) associated with an electronic message which was identified as a result of the event signal 110 (e.g. identified within the signal itself or determined by the electronic message system based on the event signal) and the dynamic update which is triggered as a result of receiving the event signal may affect all parties referenced in the electronic message (e.g. sender and recipients of an email message irrespective of whether a recipient was in the 'to' field or the 'cc' field, the organizer of an electronic appointment and all those invited, etc) or the update may affect only the sender (or originator) of the electronic message or any other subset of parties (e.g. only the recipients or only those on the 'cc' list).

The event signal 110 may be received by the messaging service 104 for action at the messaging service itself or the event signal 110 may be delivered to a particular account 106 through the messaging service 104. The subpart of the electronic message system 102, 103 (e.g. the messaging service 104 or a user account 106) which receives the event signal 110 may then trigger the dynamic update (in block 114); however the dynamic update may be implemented at that subpart or at another subpart within the electronic message system. For example, an event signal may be received at user account 106 (via the messaging service 104) which triggers a dynamic update that is implemented by that user account 106 and in some examples at multiple other user accounts 106 (e.g. at the user account of each recipient of the message being updated). In such an example, the subpart which receives the event signal may send a trigger message to the other subparts which will actually implement the dynamic update. In other examples, the event signal may be propagated within the electronic message system until it reaches a particular subpart (which may be defined within the event signal), i.e. there may be subparts that receive the event signal but do not trigger the dynamic update and instead forward the event signal onto another subpart (e.g. via the messaging service 104). For example, where an update affects only the sender/originator (which may be collectively referred to as the 'owner' of the electronic message), the event signal 110 may be propagated within the electronic message system 102, 103 towards the owner's user account 106 and the dynamic update may be processed by the owner's user account 106 or by the messaging service.

The term 'dynamic update' is used herein to refer to an update which is performed whenever it is triggered and so electronic messages are not simply updated a fixed number of times as they progress towards the recipient (i.e. once at each of a number of defined stages), and then not re-evaluated subsequently. The same electronic message may be updated many times (e.g. as a result of multiple event signals) and in some examples, the message may be updated every time the message is viewed by a user (e.g. where this update comprises checking for update triggers and implementing any triggers identified).

The dynamic update which is performed may result in the electronic message(s) content being displayed in a different manner, the message(s) being forwarded to another user or deleted from a user's account (e.g. deleted from their inbox or calendar with or without approval or confirmation from the user) or the message(s) being resent to one or more of the original recipients. In other examples, the dynamic update may result in other changes to the electronic message(s), such as a change in the content of the message itself, and further examples are described below. As described above, dependent upon the update which is performed, different functions within the messaging service 104 may be involved.

Although FIG. 1 shows only one external system 108, there may be multiple external systems which send event signals to the electronic message system 102, 103 and any external system 108 may send messages to one or more electronic message systems 102, 103. The sending of event signals 110 to the electronic message system 102, 103 may use a pull or push model. Where a pull model is used, the external system 108 may set state which is then read by the electronic message system 102, 103.

Figure 3:
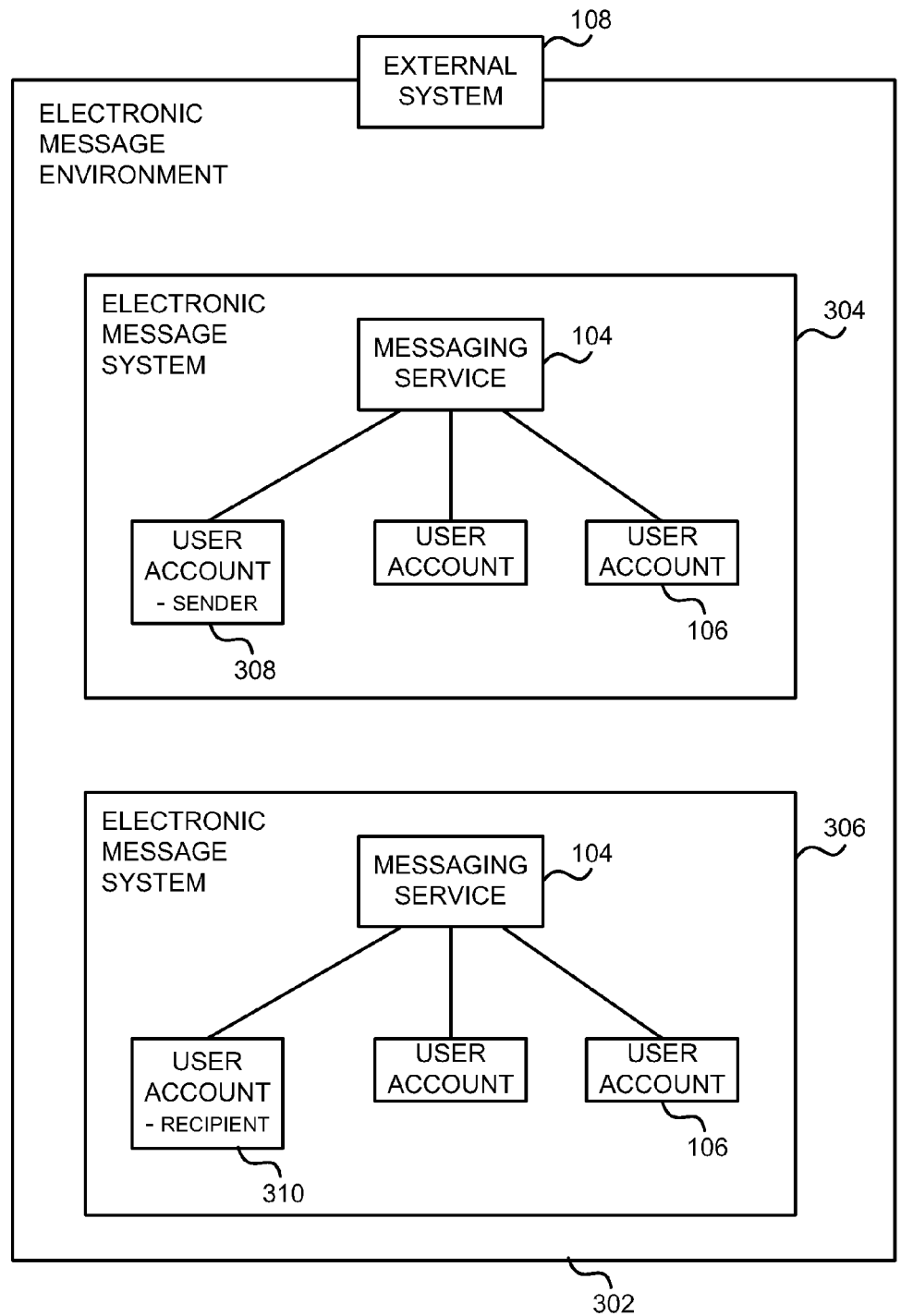
FIG. 3 is a schematic diagram of another system in which the method of FIG. 1 may be implemented.

The schematic diagrams in FIG. 1 show a single electronic message system 102, 103; however in many examples, the sender of an email message may belong to a different electronic message system to one or more of the recipients (i.e. the sender and the recipient may have user accounts 106 in different systems). In such an example, as shown in FIG. 3, an electronic message environment 302 may comprise more than one electronic message system 304, 306 with the sender's user account 308 in a different system to a recipient's user account 310. As described above with reference to FIG. 1, the external system 108 may be within the electronic message environment 302 (and in some examples within an electronic message system) or the external system 108 may be external to the electronic message environment 302.

In examples where the sender and at least one recipient are in different electronic message systems, the message exchange function 210 within the sender's messaging service 104 may receive the event signal and send instructions to the recipient's electronic message system (or to the messaging service within that system) to perform the required dynamic update. Alternatively, as all the message systems involved (e.g. all those within the message environment) are treated equally, an event signal may instead trigger an update starting from a recipient's account (rather than the sender's) and as a result instructions may be sent to the sender's electronic message system (or to the messaging service within that system) to performed the required dynamic update.

Figure 4:
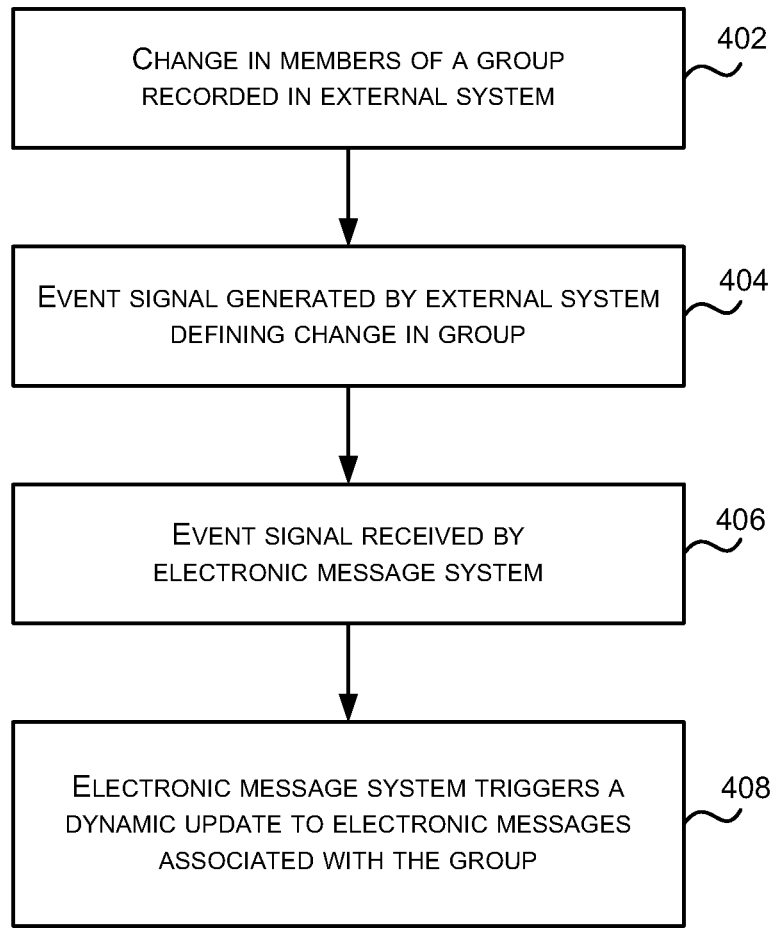
FIGS. 4-7 are flow diagrams of additional example methods of controlling an electronic message system which may be implemented in the systems shown in FIGS. 1-3.

FIG. 4 is a flow diagram of another example method of controlling an electronic message system, which is a variation of the method shown in FIG. 1 and described above. In the example shown in FIG. 4, a change in members of a group or community is recorded in an external system (block 402). This group or community may, for example, be a team or distribution list defined within an organization or a group of friends or other group/community defined within a social networking system (e.g. users who subscribe to a particular feed, are friends with a particular user, are following a particular topic, etc). The external system may, therefore, be a business management system or application which defines organizational structure (e.g. Microsoft® HeadTrax), a tool for managing identity-based access policies or distribution lists (e.g. Microsoft® Forefront® Identity Manager), a social networking system or other networking tool (e.g. a service, such as an Active Directory service, which makes a distribution list within the electronic message system accessible externally). The change which is recorded (in block 402) may be the addition or removal of members from the group or community (which may be defined in terms of a distribution list) and this information (i.e. information which defines the change in membership) is included within the event signal generated by the external system (block 404). The information included within the event signal may comprise only details of the change, e.g. the new member's details or details of the member who has left the group, or the event signal may identify all the current members of a group following a change in membership.

As described previously, the event signal is received by the electronic message system (or messaging service) from the external system (block 406) and as a result of receiving this message, the electronic message system triggers a dynamic update to one or more electronic messages associated with the group/community that has been updated (block 408). Where the change in the group includes addition of new members, the dynamic update may comprise forwarding one or more electronic messages to the new members (e.g. forwarding all meeting requests for the group to the new members or forwarding emails sent between members of the group to the new members) and in such an example, the event signal may connect with the message exchange function 210 within the messaging service 104. In some examples, there may be a time-restriction on which electronic messages are forwarded, e.g. so that only recent messages (such as those sent within the last week/month) are forwarded to the member joining the group. Where the change in the group includes the removal of members from the group, the dynamic update may comprise removing future calendar appointments relating to the group from the removed members' calendars, removing access to previously sent email messages within the group and/or changing the permissions for the removed members in relation to previously sent email messages, calendar appointments etc (e.g. such that they can no longer forward these messages onto anyone else) and in such an example, the event signal may connect with the message access manager 214 within the messaging service 104. In some examples, where a distribution list is stored within the electronic message system (in addition to, or instead of, being stored in the external system), the receipt of the event signal may also trigger an update to the stored distribution list and again in this example, the event signal may connect with the message access manager 214 within the messaging service 104.

Such a method can ensure that meeting requests (which may also be referred to as calendar appointments) reflect the current membership of the group. With existing email systems, it is necessary to manually update meeting requests to include/exclude users and this is a particular problem with calendar appointments which include recurrence (e.g. a regular group meeting every month) where the initial meeting request may have been sent out many months previously and in the intervening period there may have been many changes to the group membership. Where emails sent between members of the group (which may comprise project related email discussions) are forwarded to the new members, the new members are brought automatically up to date with the current group discussions. Should a member of a group lose all their email (e.g. as a result of equipment loss or failure), by removing the member from all the groups they belong to and then adding them back in, emails for each group will be resent to the member who had lost their email and so potentially enable them to recover some or all of their lost messages.

In an example system which implements the method of FIG. 4, the electronic message system may comprise an email system. In other examples, the system may comprise any kind of electronic message system which enables collaborative working (e.g. Microsoft® Lync or Microsoft® Live Meeting), such that, for example, if a person joins a team or a meeting late, they can automatically be provided with the information that was shared prior to their joining.

Figure 5:
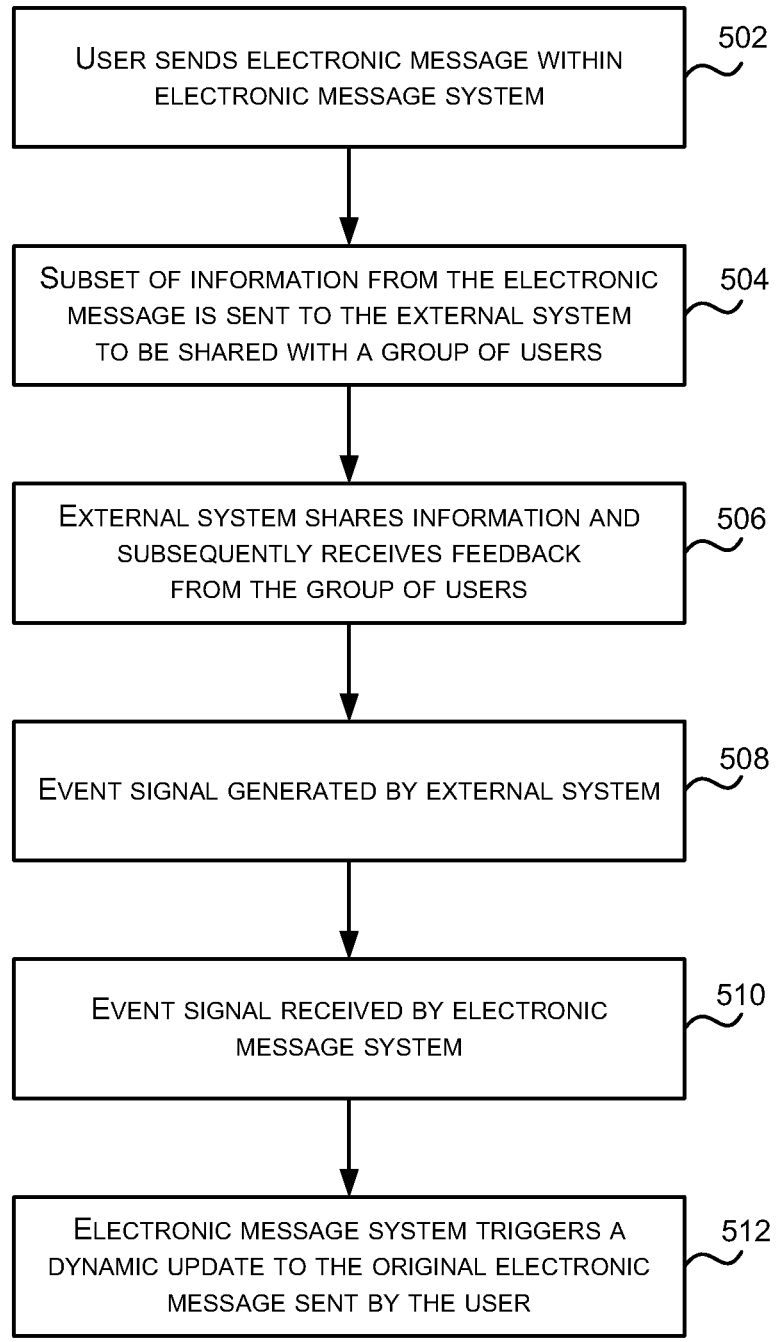

FIG. 5 is a flow diagram of a further example method of controlling an electronic message system, which is a variation of the methods shown in FIGS. 1 and 4 (described above). In this example, a user account owner (who may be referred to as the 'sender') sends a message within the electronic message system (block 502) and then a subset of information about this message is sent (by the electronic message system) to the external system to be shared with a group of users (block 504). This subset of information may be sent to the external system in or out of band. In some examples, the sending of the message (in block 502) may be done in a standard way; however in other examples a user may identify a message (e.g. through a flag) which is to be handled according to this example method and in some examples, the user may also specify the external system which is to be the recipient of the subset of information (in block 504).

The subset of information relating to the message which is shared does not comprise all the information about the message (e.g. recipients, title, content, etc) but may, for example, comprise details of the message title and message recipients but not the message content, alternatively the subset of information may comprise the content but not the recipients (e.g. for reviews, collaborative decision making or voting). In some examples, a user may specify the particular subset of information which is shared and in other examples this may be predefined or determined by the messaging service 104 or external system 108 (e.g. which specifies the information it should receive).

In this example the external system comprises a social networking system or application (or other networking tool) and the group of users may be defined by the electronic message system or the external system. Where the group of users is defined by the electronic message system, the messaging service within the electronic message system or characteristics of the group are defined (leaving the external system to identify a group satisfying these characteristics), this additional information is sent by the electronic message system to the external system along with the subset of information about the message. The group of users with which the information is shared may be totally distinct from the recipients of the original message sent (in block 504) or there may be a small amount of overlap (e.g. a few of the recipients may be members of the group but the majority of the group members are not recipients of the original message).

On receipt of the subset of information from the electronic message system (and any information defining the group), the external system identifies the group of users (if necessary) and then shares the information with the group of users. The external system then subsequently receives feedback from members of the group of users (block 506). In an example, the feedback may comprise an indication of approval or disapproval of the original message, ratings or comments (e.g. relating to a new product), an indication of the volume of responses etc. In one example application, such a method may provide parental control over individual accounts or monitoring by an administrator of open forum messaging systems. An event signal is then generated by the external system based on the feedback received (block 508) and the event signal may comprise an aggregate of all the feedback received (e.g. an overall approval indicator) or a required action which is determined by the external system based on the aggregate of all the feedback received. The event signal is received by a subpart (e.g. the messaging service 104 or a user account 106) in the electronic message system (block 510) and as a result the system triggers a dynamic update to the original electronic message which was sent by the user (block 512).

In an example, this dynamic update (in block 512) may change the way that the message is displayed either to the sender (when viewing the messages in a folder of items that have previously been sent) and/or the way that the message is displayed to the recipients and in such examples, the event signal may connect with the message viewer function 216 within the messaging service 104. In another example, the dynamic update may result in the message being deleted from the inbox of all recipients or those recipients who have not yet read the message (e.g. where the feedback received indicates disapproval of the group of users in the external system or where a parent blocks the sending of a message by their child) and in such an example, the event signal may connect with the message store manager 212 within the messaging service 104. In a further example, the message which was sent by the user (in block 502) may be delayed from reaching the recipients until the event signal is received (in block 510) and in this case the dynamic update may comprise releasing the message for delivery to the recipients or deleting the message (and possibly informing the sender of this deletion) and in such an example, the event signal may connect with the message exchange function 210 within the messaging service 104. In yet another example, the dynamic update (in block 512) may comprise changing the permissions associated with the sent message (e.g. blocking forwarding if the feedback was negative from the group within the external system or allowing forwarding if the feedback was positive).

Such a method enables the electronic message system to be controlled in part according to social/global sentiment or based on a community response within a social networking system. In a specific example, a recipient of an email message may be able to gain an indication of the community sentiment relating to the particular message (which may, for example, be a review, political campaign message, advertisement, etc) based on the color of the text within the body of the email message.

Figure 6:
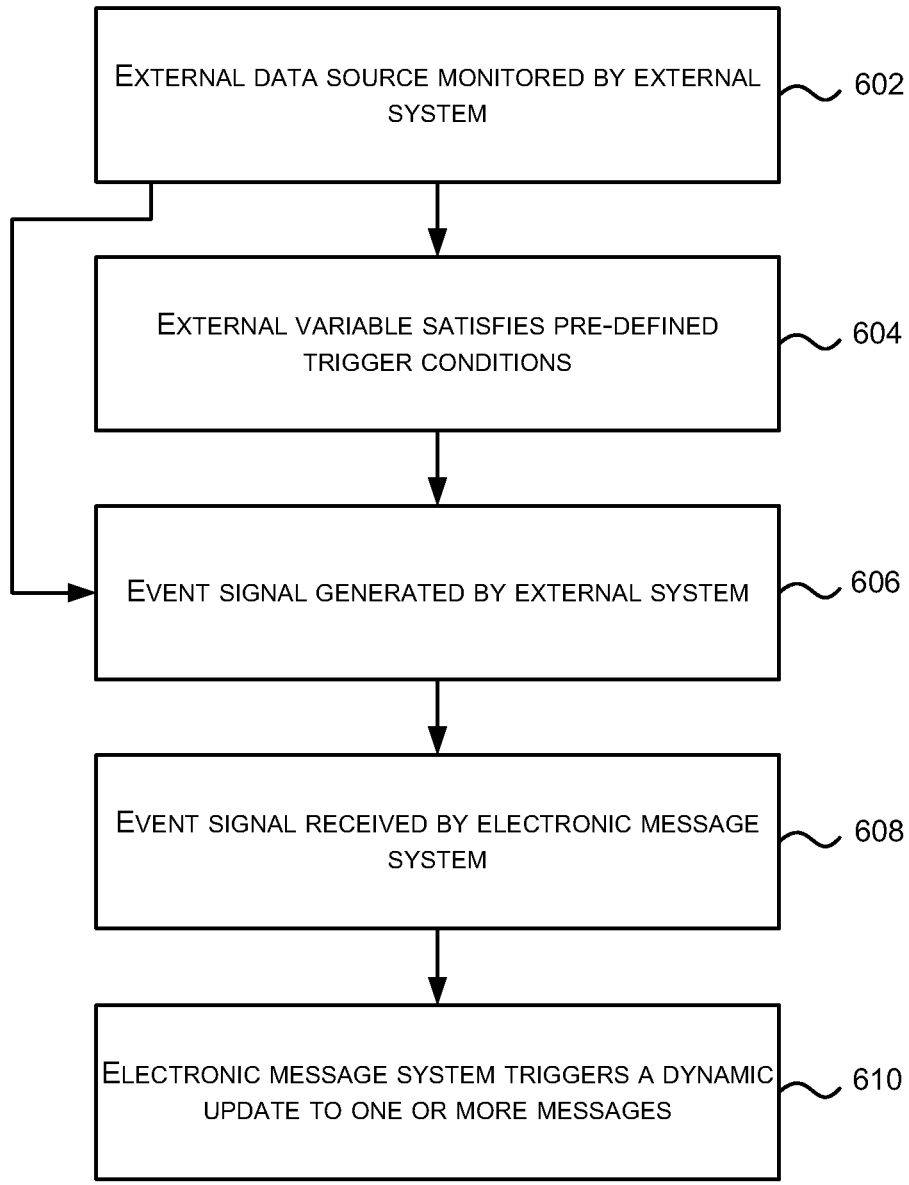

FIG. 6 is a flow diagram of a further example method of controlling an electronic message system, which is a variation of the methods shown in FIGS. 1, 4 and 5 (described above). In this example, the external system monitors one or more external data sources, such as social networks, global event calendars, news sites, etc (block 602). When the external data source satisfies pre-determined trigger conditions (block 604), the external system generates an event signal (block 606) which includes information about the external data source. The trigger conditions (which are used in block 604) may be determined by the external system or may be user-defined.

As described previously, the event signal is received by the electronic message system (block 608) and in response to this a dynamic update to one or more electronic messages is triggered (block 610). In this example, the dynamic update may comprise changing the way that electronic messages are displayed to a user.

Figure 7:
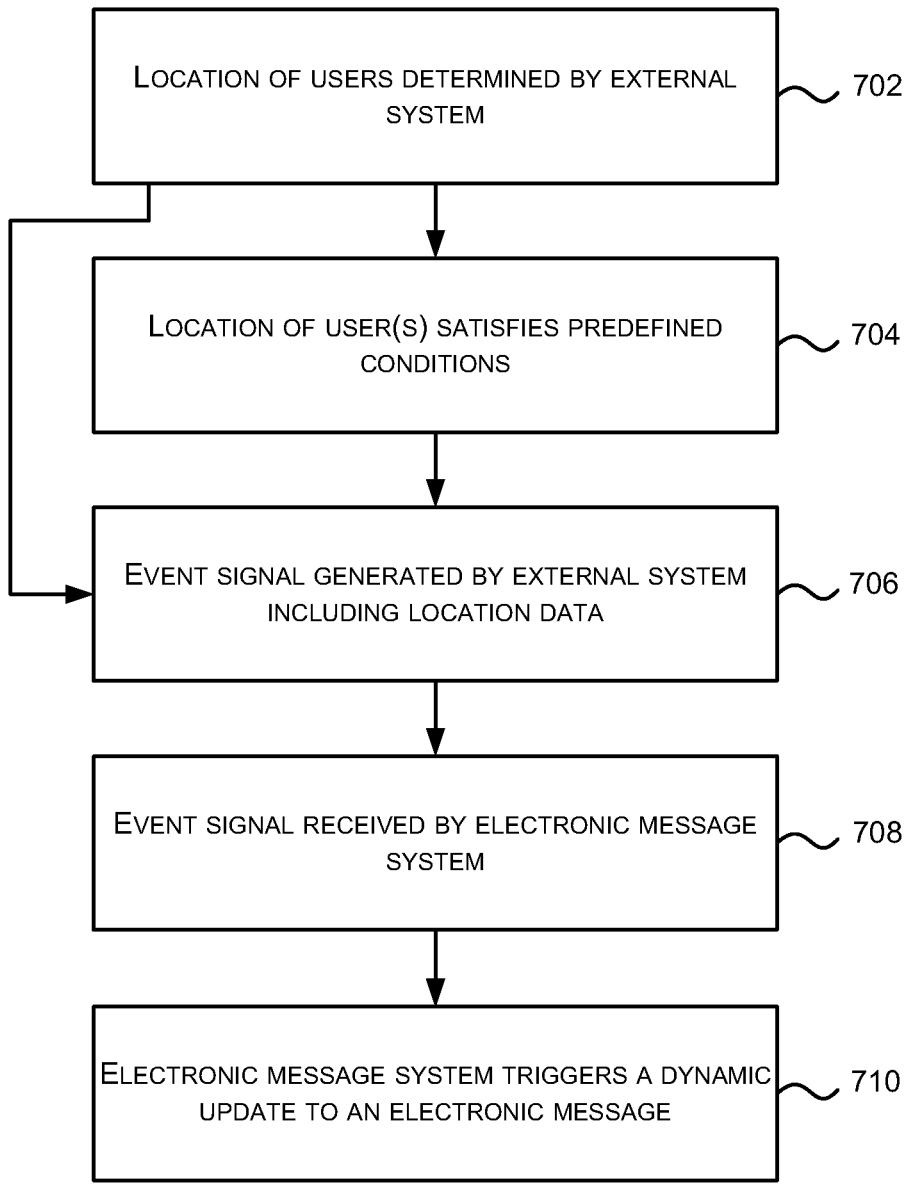

FIG. 7 is a flow diagram of a further example method of controlling an electronic message system, which is a variation of the methods shown in FIGS. 1 and 4-6 (described above). In this example, the external system is a user location system or application which locates users or devices (such as cell phones) carried by users (block 702). Such an external system may use cellular base station information, GPS information generated by devices (such as cell phones) carried by users and communicated to the external system, access system information (e.g. whether a user has swiped an access card when entering/leaving a building), proximity sensors, or any other technology for locating users. In some examples, the external system may be a social networking system which allows users to record and update their current location. Different implementations may use different granularities of location data (e.g. a binary metric of inside the workplace or not, or a precise GPS location).

In such a system, a user may provide consent for the collection and use of location data in this way when signing up to a messaging service which implements this method. In other examples, a user may be provided with an opt-out facility so that they can prevent their location being tracked and used in this way. Furthermore, any location data collected is stored in a secure manner and may be deleted as soon as it is not required. In various examples of this method, only current user location is required and in such examples, a single location data point may be stored for each user and updated regularly, so that no tracking data for a user is stored. In further examples, a user may choose whether to provide their data to the system (e.g. through recording and updating their location in a social networking system).

In this example, the external system generates an event signal (block 706) either in response to the location of one or more users satisfying predefined criteria (block 704) or in response to a change in the location of one or more users (block 704 is omitted). The event signal includes location data which may comprise the known location of a user (e.g. "user A at location X,Y" where X,Y are coordinates) or an indicator that predefined criteria have been satisfied (as determined in block 704, e.g. "Condition 3 satisfied").

As described previously, the event signal is received by the electronic message system (block 708) and in response, the system triggers a dynamic update to an electronic message (block 710). In this example, the dynamic update may comprise releasing a previously sent message or changing access permissions to a message (e.g. such that a user can read the message if in location Z, but not at other locations). The event and/or the dynamic update which is triggered may be based on the location of a single user, who may be the sender or a recipient of the message and the trigger may affect the message for just that single user, for multiple users (e.g. for all recipients) or for all users associated with the message (i.e. sender and recipient). In an example, only when the sender is at (or has reached, but may subsequently have left) a particular location, the recipients may be able to read a message. In other examples, the event and/or the dynamic update which is triggered may be based on the location of multiple users where the group of users may be defined by the electronic message system (e.g. the recipients of the message) or another system (e.g. a social networking system which is an additional external system which interfaces to the electronic message system and/or the user location system). For example, recipients may only receive a previously sent message when a group of users (who may be the recipients themselves) are co-located or when they are all at a specific location. In this example, the electronic message system may delay delivery of a message until the dynamic update is triggered or may allow delivery but prevent a message from being read until the dynamic update occurs.

In such an example, a subsequent event signal generated by the external system and received by the electronic message system may indicate further changes in user(s) location(s) (e.g. "Condition 3 no longer satisfied") and this may result in the reversing of any actions which were triggered as a result of receiving the first event signal (e.g. canceling access permissions which were granted).

In this example method, the pre-defined conditions which may be used to define when the event signal is generated (in blocks 704-706) may be specific to a particular message. In such an example, a user may be able to specify location criteria when drafting a message and then when this message is sent by the user, the electronic message system may extract the location criteria and then either send them to the external system (for use in block 704) or store them and evaluate them when an event signal is received (in block 708) to determine whether to trigger a dynamic update to the particular message or not.

The example shown in FIG. 7 and described above, provides a method of securing electronic messages based on the locations of one or more users. For example, sensitive email messages may be set so that they can only be read by users within the workplace but cannot, for example, be read when a user is outside of the workplace, irrespective of the type of device (e.g. desktop PC or handheld device) that the user uses to view their email messages.

Although FIGS. 4-7 show four variations of the method shown in FIG. 1, it will be appreciated that aspects of any of the examples may be combined in any way. In describing each flow diagram different examples are given for the dynamic update to an electronic message (in blocks 408, 512, 610 and 710) and any of the examples given in any of the methods may be applied to any of the other methods.

In the methods described above, the external system 108 sends an event signal 110 which is received by an electronic message system and triggers an update. In a variation of the methods described above, the external system may receive a notification of the completed action (e.g. of the triggering or completion of the dynamic update) and this notification may be received based on the same mechanism that enables the external system to communicate with the message systems in order to send the event signal. Consequently any of the methods shown in FIGS. 1 and 4-7 may be modified to include an additional step of sending a notification back to the external system that a certain action has been completed and this step is performed after the event signal has been received and acted upon.

In many of the examples described above, the update propagates from a sender's account or messaging service to a recipient's account or messaging service. This functionality may, for example, be achieved using one of two approaches. The first approach involves creating a middleware that connects the external system(s) with the electronic message system, where the middleware performs analysis of the external data and 'translates' it into the form that the message system can further process/propagate through the messaging service. Alternatively, the message system may be enhanced with the analysis of the external signals and then instantiate actions through the messaging service.

In other examples, however, the changes may flow in the opposite direction (i.e. the update may propagate from a recipient's account or messaging service to a sender's account or messaging service) or the external event signal may link into both the sending and receiving message systems (or messaging services). As described above, there is equal capability for all message systems involved. In an example scenario where both the sending and receiving messaging services may be involved, the external event is related to one of the recipients, e.g. the person is knighted and has a new title of 'Sir' instead of 'Mr'. In order that the new title is propagated through the recently received messages, the messages need to be changed backward through the messaging channel. In such a scenario, the event signal may be sent to either or both the sender's messaging service and the recipient's messaging service, messages involving the person with the new title are identified and a dynamic update is triggered to action the change in title.

The methods described above may treat all the messaging systems involved in the message transmission equally (i.e. the method may treat the sender's messaging system and the recipient's messaging system equally). Thus, the method may activate the transmission based on a signal received from the recipient's of a message or invitee to a meeting (where the electronic message is an appointment or meeting request) rather than the entity that initiated the original message/invite.

Figure 8:
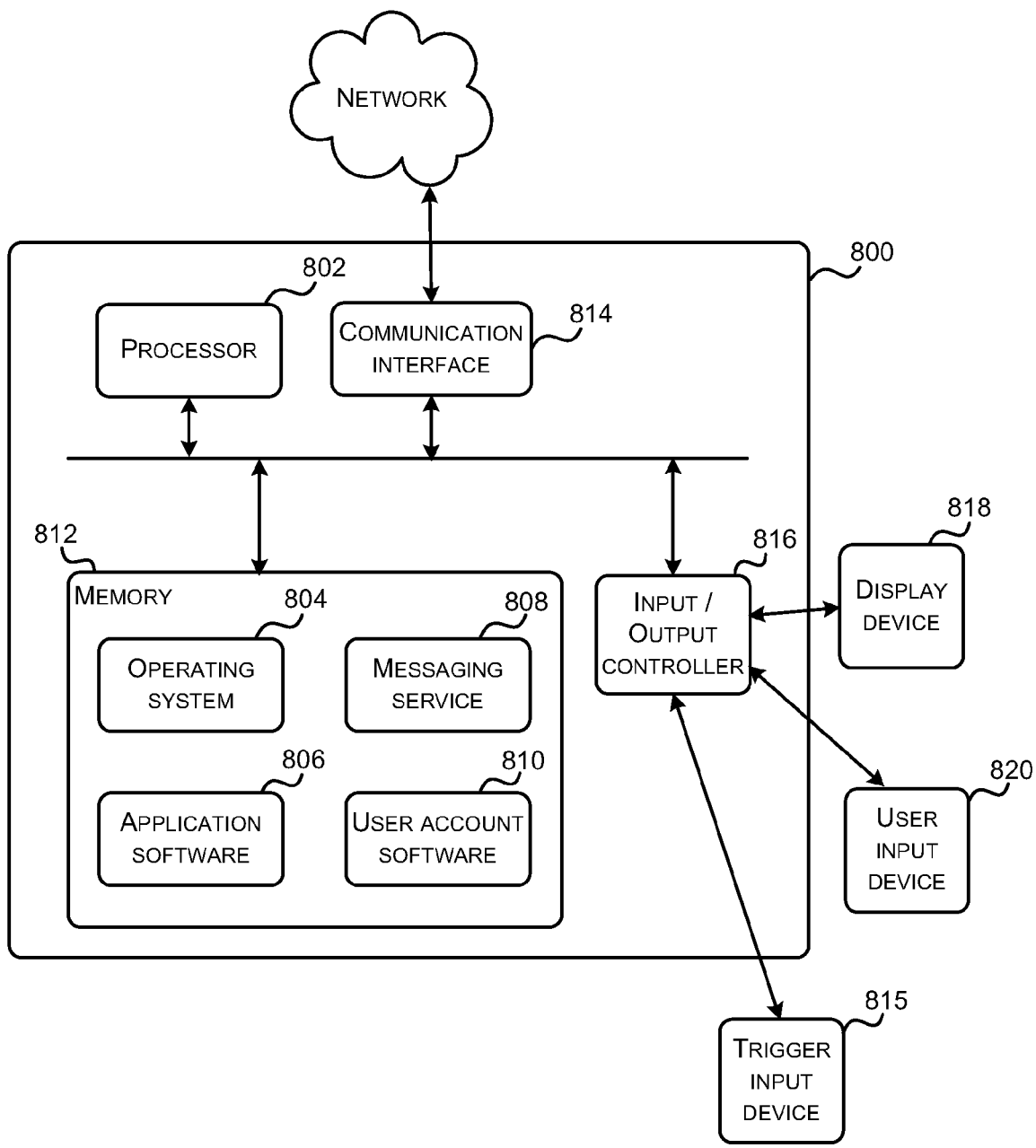
FIG. 8 illustrates an exemplary computing-based device in which embodiments of the methods shown in FIGS. 1 and 4-7 may be implemented.

FIG. 8 illustrates various components of an exemplary computing-based device 800 which may be implemented as any form of a computing and/or electronic device, and in which embodiments of methods described above may be implemented. The computing-based device 800 may act as a node within an electronic message system (e.g. client, server, node within a peer to peer architecture, etc) and may host the messaging service 104 and/or one or more user accounts 106. Consequently such a node may receive an event signal from another node in the electronic message system or the external system and may trigger a dynamic update in one or more electronic messages (either at that node or another node) or may forward the event signal on to another node.

Computing-based device 800 comprises one or more processors 802 which may be microprocessors, controllers or any other suitable type of processors for processing computer executable instructions to control the operation of the device in order to either trigger dynamic updates in response to receipt of an event signal or to implement the dynamic update in response to a trigger message received from another node in the electronic message system. In some examples, for example where a system on a chip architecture is used, the processors 802 may include one or more fixed function blocks (also referred to as accelerators) which implement a part of the method of triggering/performing dynamic updates to electronic messages (or any other part of the methods described above) in hardware (rather than software or firmware). Platform software comprising an operating system 804 or any other suitable platform software may be provided at the computing-based device to enable application software 806, 808, 810 to be executed on the device. The application software may include the messaging service 808 and/or one or more user accounts 810. In some examples, the methods described herein may be implemented in middleware that can communicate with any electronic message system and the appropriate functions within the system (e.g. as shown in FIG. 2).

The computer executable instructions may be provided using any computer-readable media that is accessible by computing based device 800. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 800 it will be appreciated that the storage may be distributed or located remotely and accessed via a network or other communication link (e.g. using communication interface 814).

The computing-based device 800 may receive event signals via the communication interface 814 and/or from a trigger input device 815 via an input/output controller 816. The input/output controller 816 may further be arranged to output display information to a display device 818 which may be separate from or integral to the computing-based device 800. The display information may provide a graphical user interface. The input/output controller 816 is also arranged to receive and process input from one or more devices, such as a user input device 820 (e.g. a mouse or a keyboard). This user input may be used to create electronic messages (where the node is acting as a client, e.g. in block 502 of FIG. 5), specify rules associated with an electronic message (as described above with reference to FIG. 7) etc. In an embodiment the display device 818 may also act as the user input device 820 if it is a touch sensitive display device (e.g. where the node is a tablet PC or smart phone or where the user has a touch sensitive display connected to a desktop PC). The input/output controller 816 may also output data to devices other than the display device, e.g. a locally connected printing device (not shown in FIG. 8).

Although many of the examples are described and illustrated herein as being implemented in an email system, the system described is provided as an example and not a limitation. As those skilled in the art will appreciate, the present examples are suitable for application in a variety of different types of electronic messaging systems, including calendar systems, text message (e.g. SMS) systems etc.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of controlling an electronic message system, the method comprising:
receiving at a messaging service in the electronic message system, an event signal relating to an event external to the messaging service, the event signal being received from an external system which is separate from the messaging service, the event signal comprising at least location data for one or more owners of user accounts in the electronic message system;
identifying one or more electronic messages within the electronic message system based on the event signal received and triggering a dynamic update to the identified one or more electronic messages in response to receipt of the event signal; and
prior to receiving the event signal, sending a subset of information associated with an electronic message to the external system for sharing with a group of users of the external system, the electronic message having been created by a user account owner in the electronic message system,
wherein identifying one or more electronic messages based on the event signal received and triggering a dynamic update to the identified electronic messages comprises:
identifying the electronic message created by user account owner and triggering a dynamic update to the identified electronic message in response to receipt of the event signal from the external system.

2. A method according to claim 1, wherein the event signal defines a change in membership of a group and wherein identifying one or more electronic messages based on the event signal received comprises:
identifying one or more electronic messages associated with the group.

3. A method according to claim 2, wherein the event signal identifies a new member of the group and wherein triggering a dynamic update comprises triggering an action of forwarding at least one identified electronic message associated with the group to the new member.

4. A method according to claim 3, wherein the at least one electronic message comprises a calendar appointment.

5. A method according to claim 2, wherein the event signal identifies a member who is no longer a member of the group and wherein triggering a dynamic update comprises triggering an action of removing permissions for the member from at least one electronic message associated with the group.

6. A method according to claim 1, wherein the event signal identifies a specific electronic message and identifying one or more electronic messages based on the event signal received comprises:
identifying the specific electronic message identified in the event signal received.

7. A method according to claim 1, wherein the group of users of the external system does not contain any recipients of the electronic message created by the user account owner.

8. A method according to claim 1, wherein the event signal comprises feedback data describing feedback received by the external system from the group of users of the external system, the feedback relating to the subset of information associated with the electronic message created by the user account owner.

9. A method according to claim 1, wherein the event signal relates to an external data source monitored by the external system.

10. A method according to claim 1, wherein identifying one or more electronic messages based on the event signal received comprises:
identifying an electronic message associated with at least one of the one or more user account owners in response to receipt of the event signal.

11. A method according to claim 1, wherein the electronic message system comprises an email system and the electronic message comprises an email or a calendar appointment.

12. A method according to claim 1, wherein the external system is not an electronic message system.

13. A method according to claim 1, wherein the external system is a social networking system.

14. A node in an electronic message system, the node comprising:
a processor;
a communications interface for receiving event signals from an external system, an event signal relating to an event which is external to the electronic message system, the event signal comprising at least a notification of receipt of negative feedback regarding a message from users who have read the message;
a memory arranged to store processor-executable instructions, which when executed cause the processor to:
identify one or more electronic messages within the electronic message system based on an event signal received and trigger a dynamic update to the identified one or more electronic messages in response to receipt of the event signal, the dynamic update comprising at least deleting the message from the inbox of users who have not read the message;
prior to receiving the event signal, send a subset of information associated with an electronic message to the external system for sharing with a group of users of the external system, the electronic message having been created by a user account in the electronic message system; and
identify the electronic message created by the user account and trigger a dynamic update to the identified electronic message in response to receipt of the event signal from the external system.

15. One or more computer storage device, with device-executable instructions that, when executed by a computing system, direct the computing system to perform for performing steps comprising:
receive an event signal relating to an event external to an electronic message system, the event signal being received from a system external to the electronic message system and the event signal defining a change in membership of a group of users, each user having a user account in the electronic message system, the external system being a user location system arranged to determine the location of a user using at least one of GPS information or access system information;

triggering a dynamic update to an electronic message associated with the group of users in response to receipt of the event signal; and prior to receiving the event signal, sending a subset of information associated with an electronic message to the system external to the electronic message system for sharing with a group of users of the system external to the electronic message system, the electronic message having been created by a user account in the electronic message system, wherein triggering a dynamic update to the identified electronic messages comprises:

identifying the electronic message created by the user account and triggering a dynamic update to the identified electronic message in response to receipt of the event signal from the system external to the electronic message system.

16. One or more computer storage device, according to claim 15, wherein the event signal identifies a new member of the group, the new member having a user account in the electronic message system and wherein triggering a dynamic update comprises triggering an action of forwarding at least one electronic message associated with the group to the user account of the new member.

17. One or more computer storage device according to claim 15, wherein the electronic message system comprises an email system and the at least one electronic message comprises a calendar appointment.

18. One or more computer storage device according to claim 17, wherein the event signal identifies a user who is no longer a member of the group and wherein triggering a dynamic update comprises triggering an action of removing the calendar appointment from an electronic calendar of the user who is no longer a member of the group.

19. A node in an electronic message system according to claim 14, wherein the event signal further comprises location data for one or more owners of user accounts in the electronic message system.

* * * * *